May 23, 1967  LA VERN H. BARRETT  3,320,768
REFRIGERATION APPARATUS FOR FREEZING
A PRODUCT UNDER PRESSURE
Filed Aug. 11, 1965   14 Sheets-Sheet 8

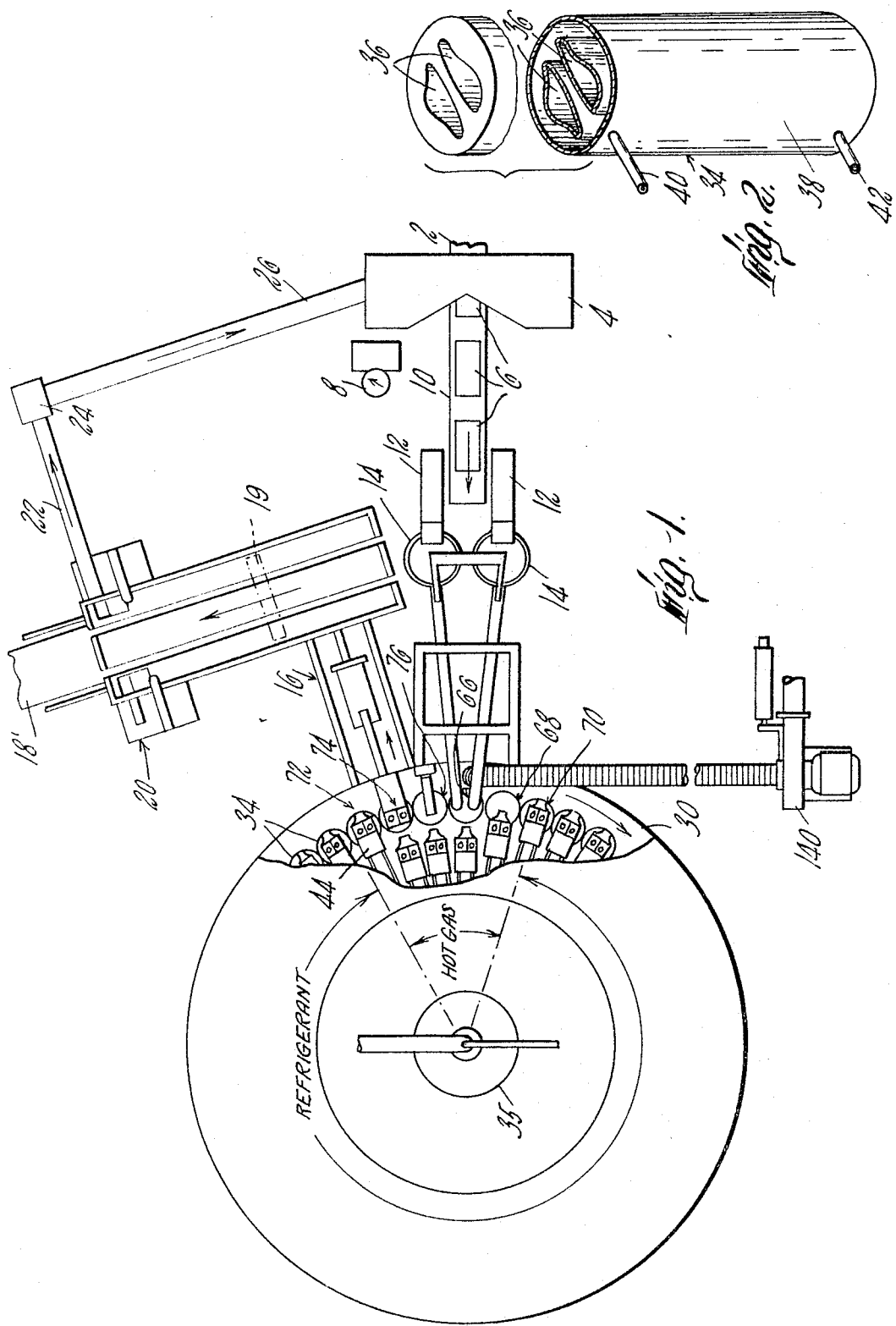

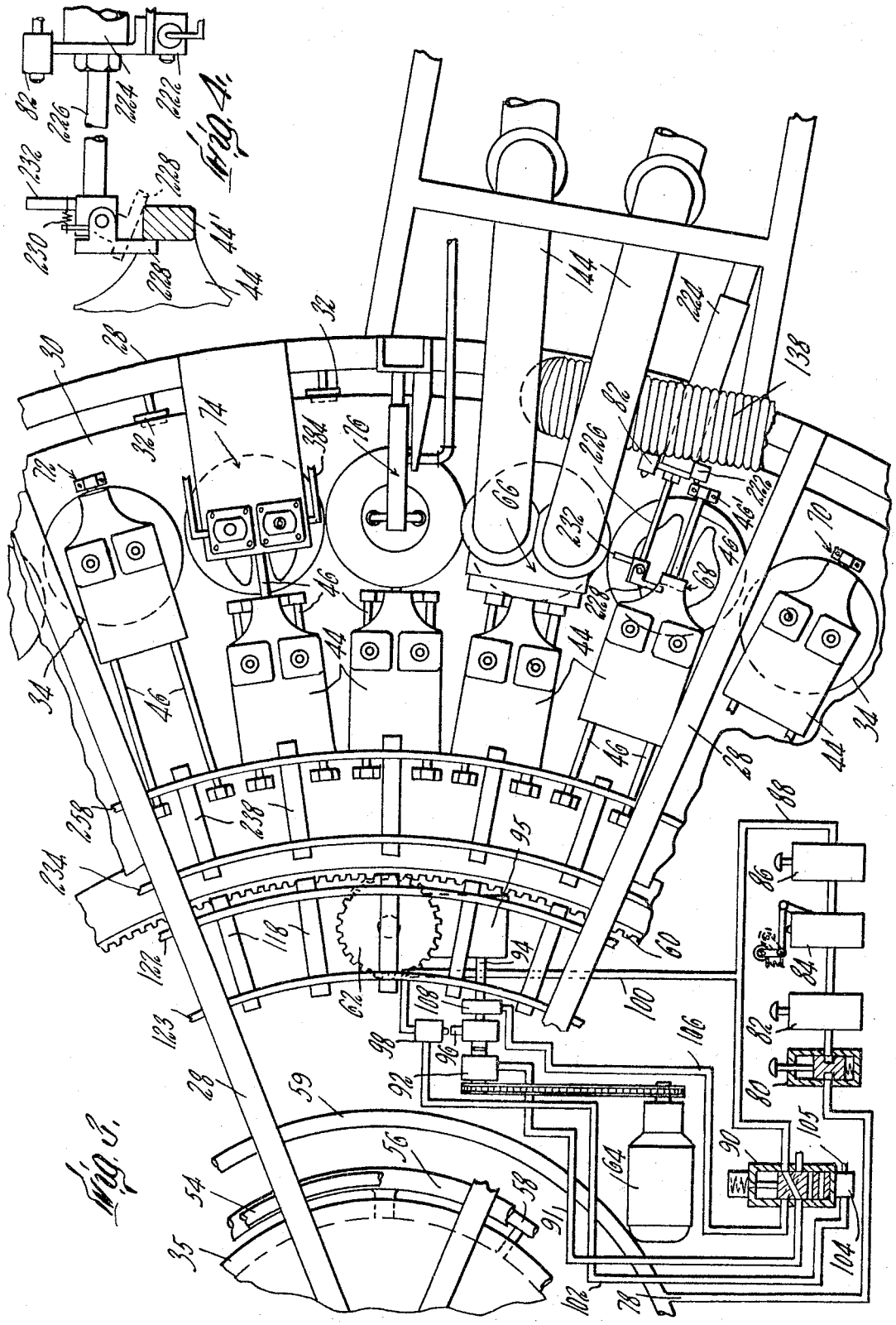

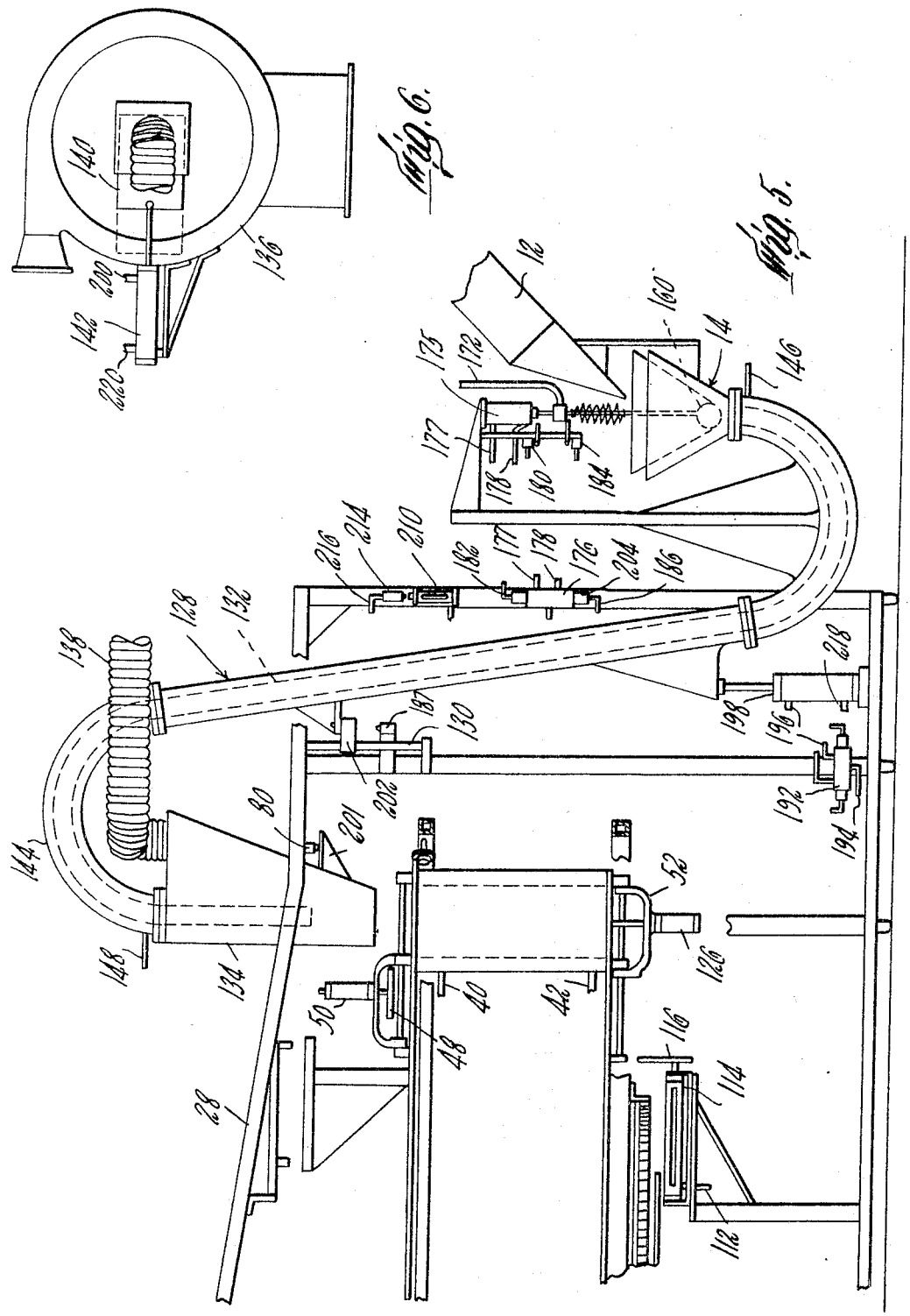

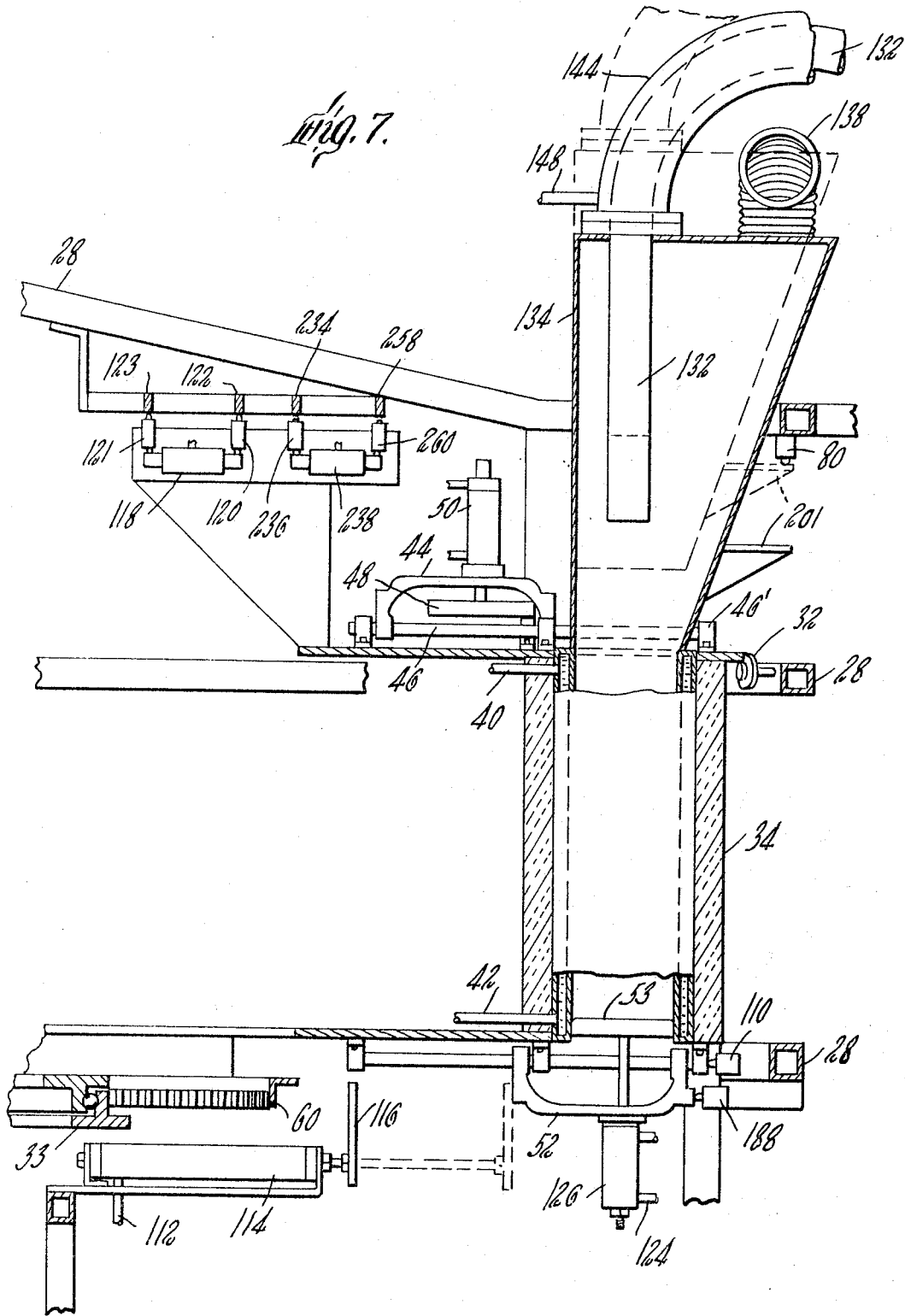

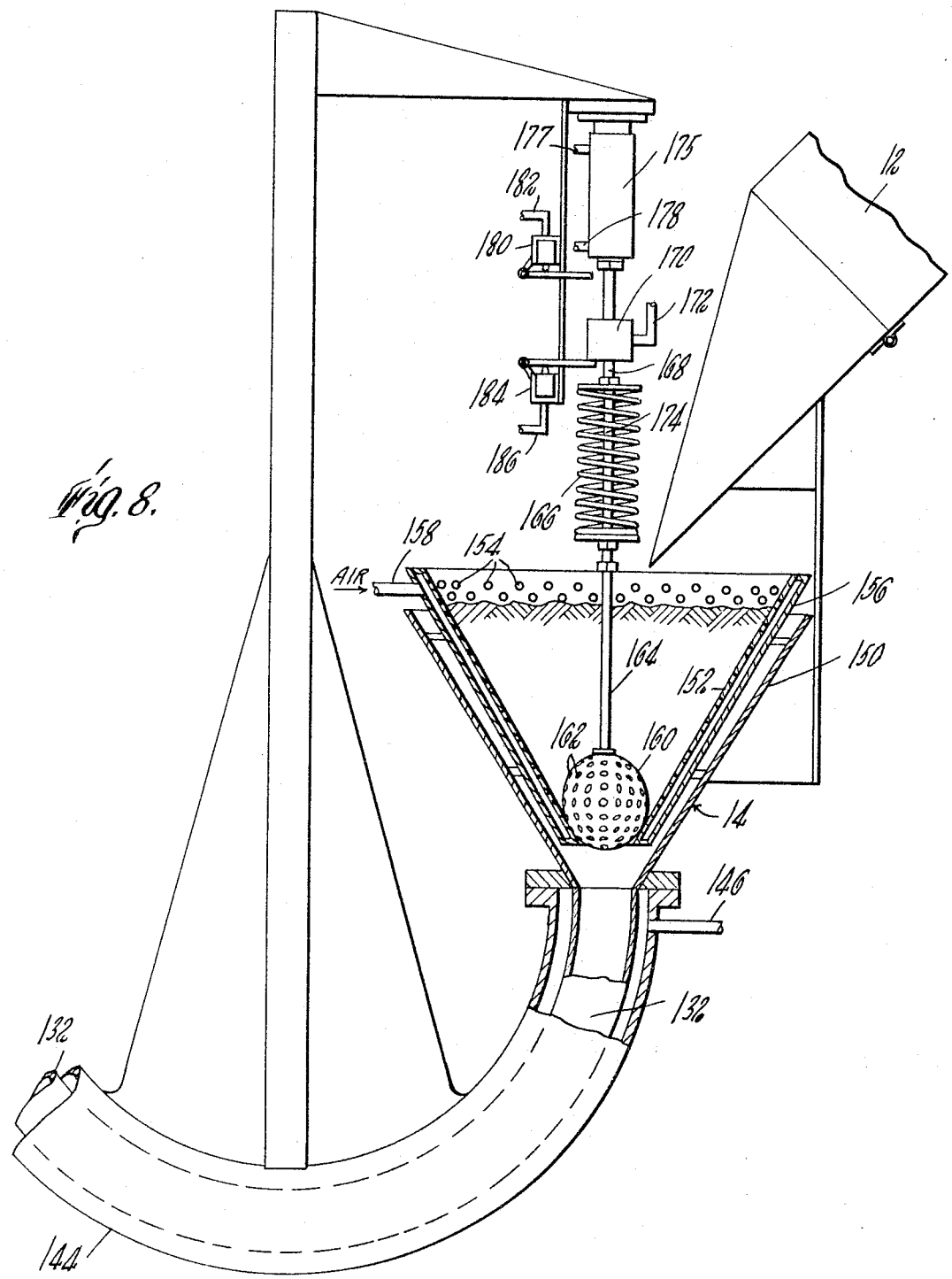

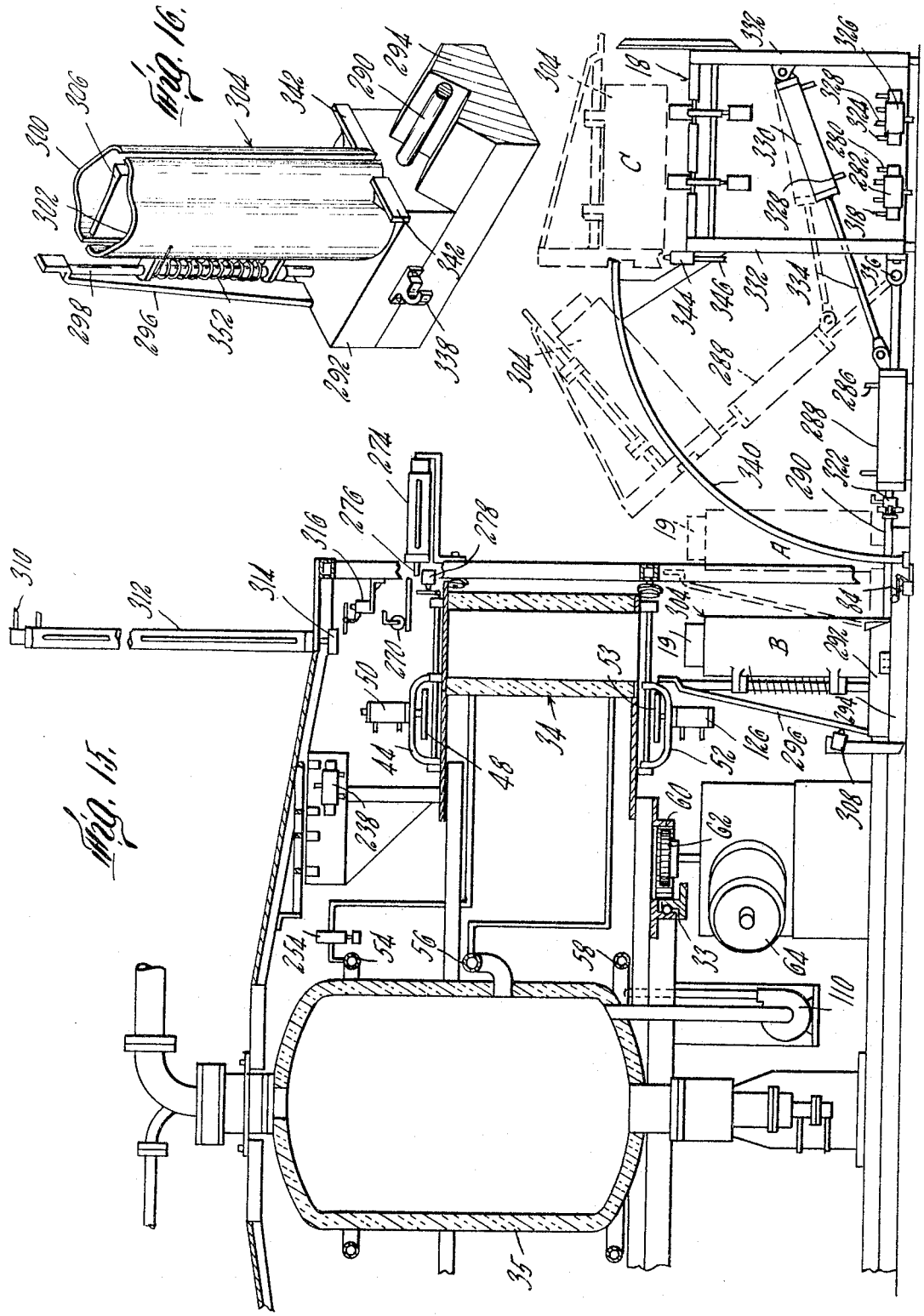

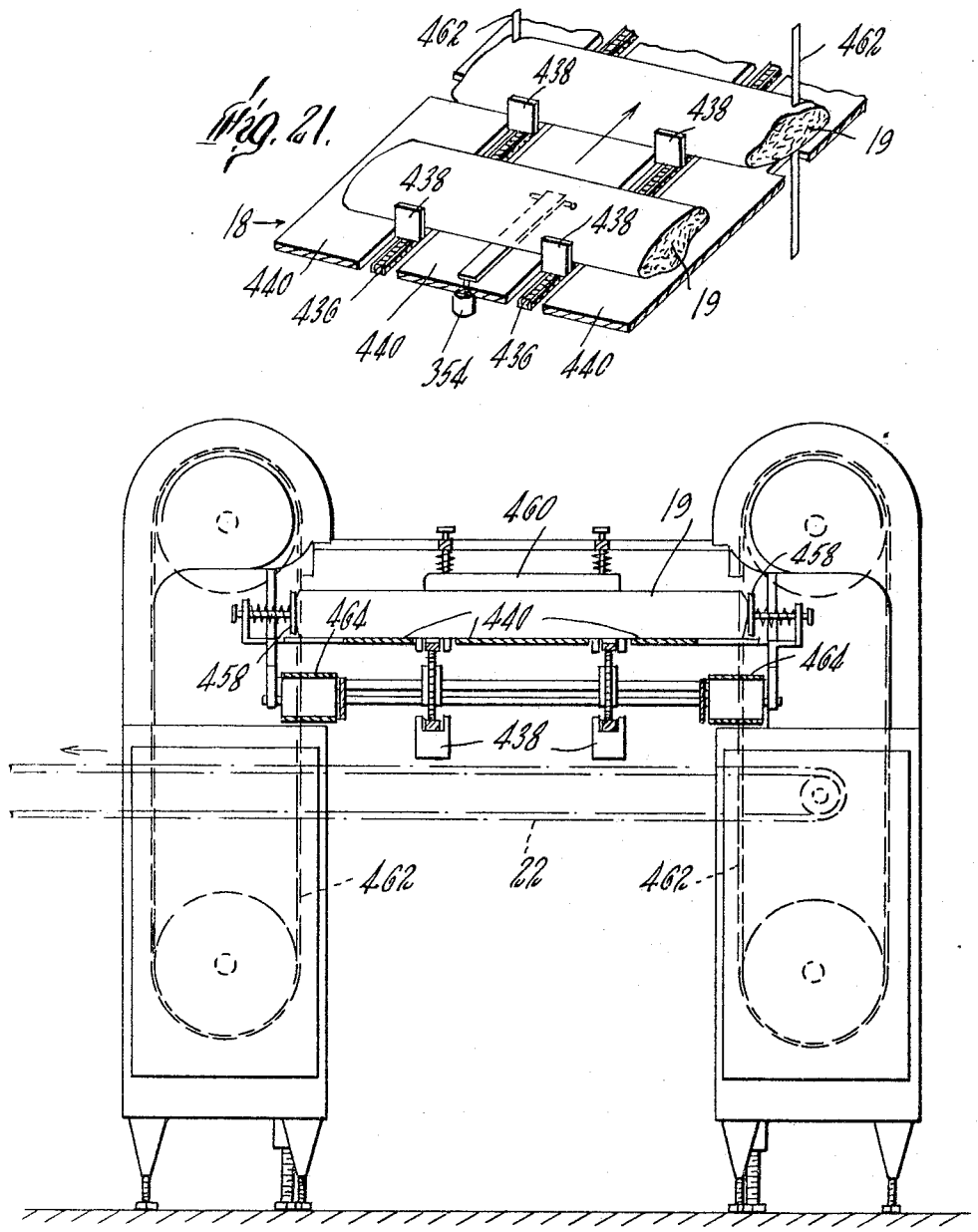

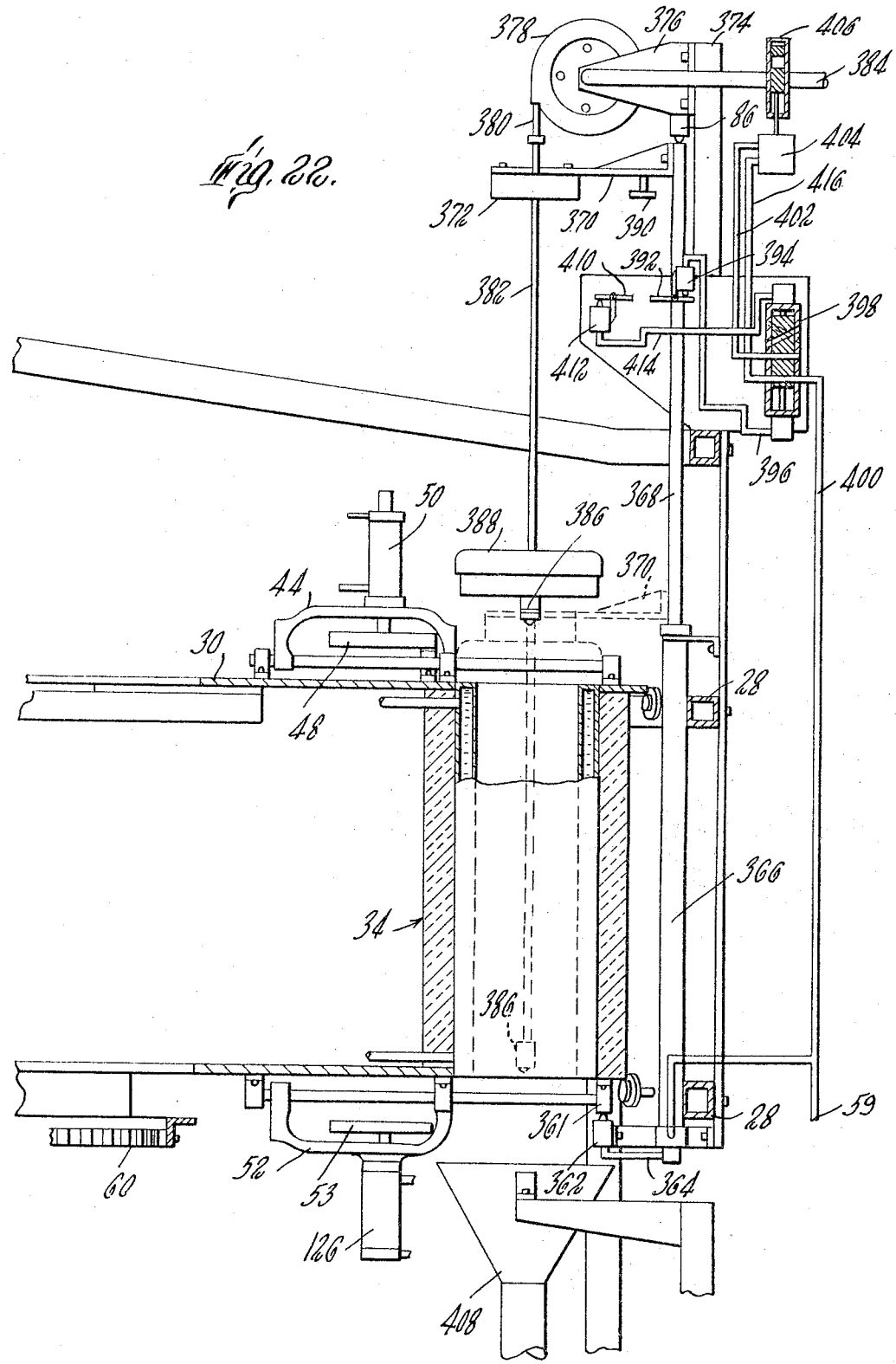

United States Patent Office 3,320,768
Patented May 23, 1967

3,320,768
REFRIGERATION APPARATUS FOR FREEZING A PRODUCT UNDER PRESSURE
La Vern H. Barrett, Gloucester, Mass., assignor to The Gorton Corporation, Gloucester, Mass., a corporation of Massachusetts
Filed Aug. 11, 1965, Ser. No. 478,794
30 Claims. (Cl. 62—303)

The present invention relates to refrigeration and more particularly to apparatus for freezing perishable foodstuffs, typically fish portions.

While the invention is applicable to the freezing of various materials, including perishable foodstuffs, it is especially useful in the processing of meat and fish and particularly fish fillets, and therefore will be described and disclosed by reference to this particular use as an example of its utility and advantages, although the invention is not limited in its application to any particular class of material.

It is a widespread practice in the marketing of fish products to quick freeze a number of fish portions, such as fillets, into a frozen unit, known in the industry as a block. The processing and freezing apparatus and procedures heretofore available for this purpose have, however, suffered from various disadvantages. They have mostly involved handling and packing together of the separate unfrozen portions by hand which is costly and introduces the hazard of more or less bacterial contamination. In the case of fish fillets such hand assembly of the separate portions into the unit to be frozen has led to an undue amount of breakage of the frozen units due to the presence of cleavage planes because of the way the fillets are arranged before freezing. Such prior methods of handling have led to the presence of voids in the frozen product and particularly to a lack of uniformity from block to block as respects the amount of voids, introducing complications and difficulties in controlling the weight of individual packages. Certain widely used prior procedures can produce frozen products of rectangular form only. Unavoidable time lags between the handling of the fillets by the operators and the freezing operation has increased the risk of deleterious effects from bacterial contamination.

An object of the invention is to overcome the above difficulties and to provide an improved system for the processing of separate objects into frozen units.

A further object of the invention is to provide apparatus for processing fish portions wherein the frozen end product may be of various desired shapes other than rectangular.

Another object of the invention is to provide for accurate control of the dimensions of the individual frozen units and great uniformity in this respect.

Another object is to provide apparatus for processing fish portions which provides an improved yield.

Another object is to provide apparatus which will produce frozen units which are highly uniform in density from unit to unit.

Another object is to make the processing of fish portions into blocks more fully automatic than has heretofore been possible.

Another object is to reduce the amount of hand packing and handling of the fillets preparatory to freezing.

A further object of the invention is to provide an apparatus which will afford faster processing and freezing and thus reduce the hazard of bacterial deterioration of the product and improve its edibility.

Other objects, features and advantages of the invention will become apparent from the following description of an illustrative embodiment thereof wherein reference is made to the accompanying drawings, in which FIG. 1 is a plan view showing the general organization of the apparatus;

FIG. 2 is a perspective view of one of the freezing units;

FIG. 3 is a fragmentary detail plan view to an enlarged scale;

FIG. 4 is a detail plan view showing part of the mechanism for moving the head unit to closing position;

FIG. 5 is a vertical sectional view, partly broken away and in elevation, showing the arrangement of parts at the loading station;

FIG. 6 is an elevation of the exhaust fan forming part of the loading structure;

FIG. 7 is a vertical sectional view partly in elevation showing details of part of the loading structure;

FIG. 8 is similar to FIG. 7 but showing another part of the loading structure;

FIG. 15 is a vertical sectional view partly in elevation showing the mechanism at the unloading station;

FIG. 16 is a detail perspective view of a part of the unloading mechanism appearing in FIG. 15;

FIG. 20 is a vertical sectional view partly in elevation taken on line 20—20 of FIG. 19;

Figure 9:
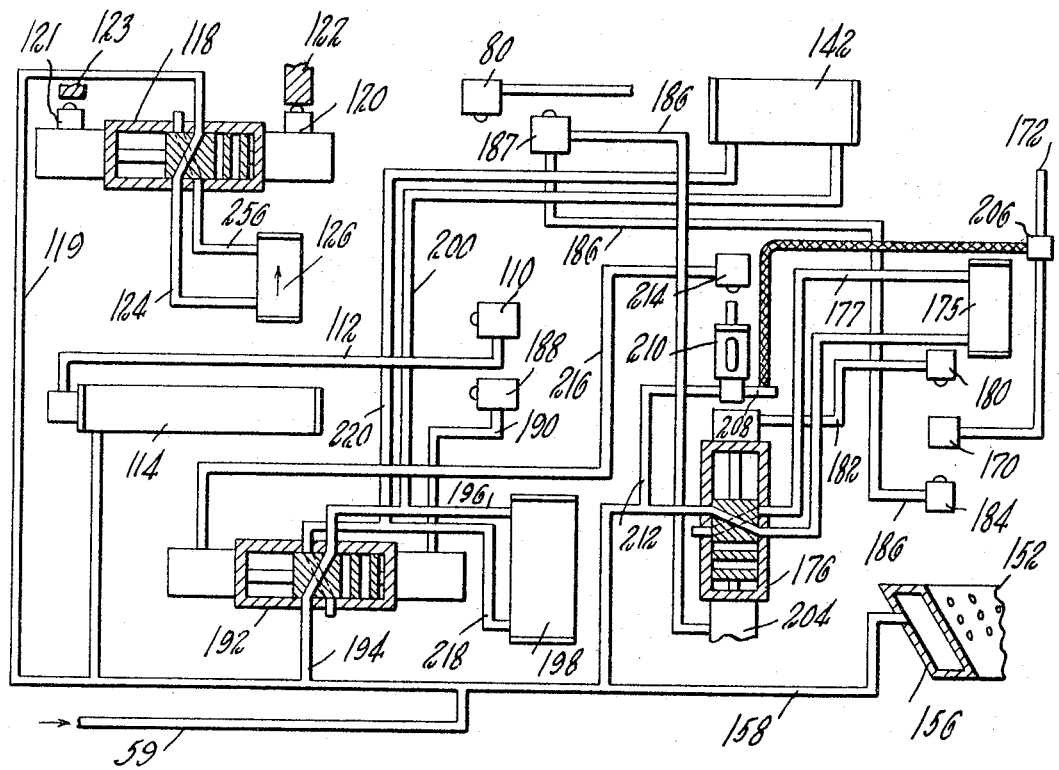
FIG. 9 is a piping diagram of the circuits of the air motors and control valves of the loading mechanism.
Figure 10:
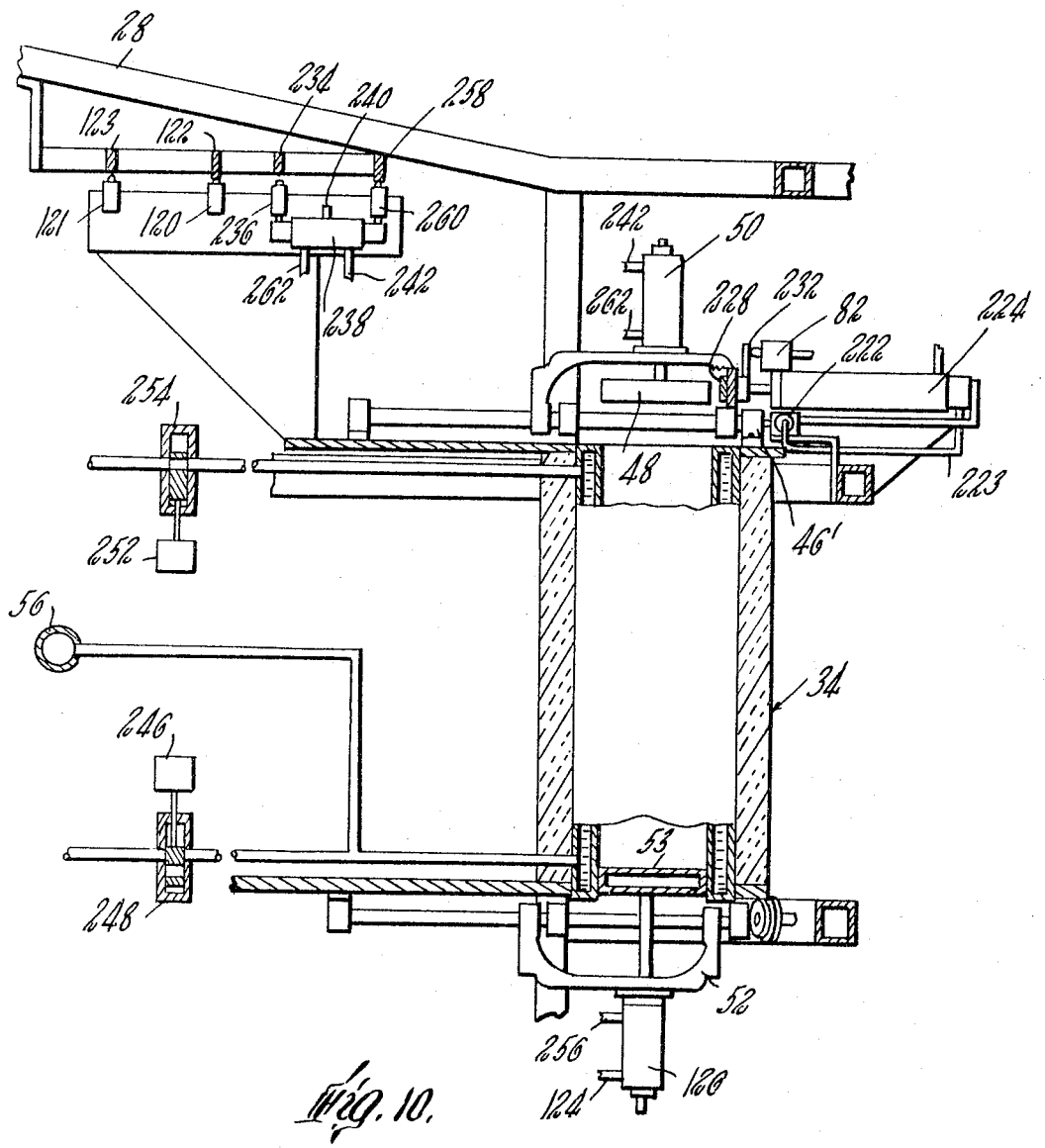
FIG. 10 is a vertical sectional view partly in elevation taken through the radial center line of the head unit closing station.

FIG. 21 is a perspective view illustrating the step of trimming the ends of the logs on the unloading conveyor; and, FIG. 22 is a vertical sectional view partly in elevation taken on the radial mid-plane of the washing and cleaning station, showing the cleaning mechanism at this station and the operating and control system therefor. The invention provides a freezing apparatus comprising a plurality of freezing tubes adapted to receive material to be frozen, a filling mechanism by which the tubes are successively filled and an unloading mechanism for unloading frozen material from the tubes in succession, said tubes being relatively movable with respect to said filling mechanism and said unloading mechanism. It includes driving mechanism to produce such relative movement so that such tubes in succession and said filling mechanism are positioned with respect to each other for filling of said tubes successively by said filling mechanism and so that said tubes in succession and said unloading mechanism are positioned with respect to each other for unloading of the filled tubes successively by said unloading mechanism. The apparatus further provides mechanism for refrigerating the contents of the tube during said movement and mechanism for producing a condition of lowered air pressure within the freezing tube during filling thereof. The apparatus preferably also includes a stationary frame which carries a turntable for step-by-step rotation thereon, upon which turntable the freezing tubes are supported for movement successively to the various work stations at which the various functions are performed. The apparatus also preferably includes mechansm for closing both ends of the tube and applying pressure to its contents while its contents are being refrigerated and mechanism for moving said closing mechanism away from the ends of the tube when in unloading position. Also, preferably, the apparatus includes mechanism for supplying heat to each freezing tube for example, by use of hot refrigerant, to condition the tube and contents for discharge of its frozen contents, and a ram movable axially into the tube for ejecting the frozen contents. Also, the apparatus preferably includes a conveyor for delivering the frozen material from the apparatus and a receptacle for receiving the frozen material from the tube and delivering it to the conveyor in a predetermined orientation with respect to the conveyor. Further the apparatus preferably includes mechanism for cleaning an empty tube. Also, the mechanism for closing the ends of the tube may comprise a closing unit movable toward and away from said tube into and out of a closing position and a head mounted on said closing unit for movement axially of the tube when the closing unit is in closing position. The apparatus may include trimming mechanism for trimming the frozen material to a standard dimension while it is on the conveyor which delivers it from the apparatus, and may include mechanism for defrosting the frozen trimmings. The apparatus may include a loading conveyor for delivering material to be frozen to the loading mechanism and a conveyor for delivering the defrosted trimmings to a point adjacent the loading conveyor. Desirably the loading mechanism includes a hopper for receiving material to be frozen, a loading tube for connecting the bottom of said hopper to the open upper end of said freezing tube and apparatus for lowering the pressure within the freezing tube and loading tube to cause material to move from said hopper into said freezing tube. Said hopper may be provided with a multiplicity of perforations in its inner surface and include mechanism for directing streams of air into the hopper through the perforations. The apparatus may include a feed member vertically movable within said hopper and adapted in its lower position to substantially close the outlet of the hopper, together with mechanism for vertically oscillating the feed member, which feed member may have a multiplicity of perforations in its surface and mechanism may be provided for directing streams of air outwardly through said perforations. Preferably the apparatus includes mechanism associated with each of said loading, unloading, cleaning and tube closing mechanisms to prevent rotation of said turntable during the operation of the respective mechanism, and mechanism at each of said loading, unloading, cleaning and tube closing mechanisms for causing the respective mechanism to perform a cycle of operation upon arrival of a freezing tube at the respective mechanism, and driving mechanism for rotating said turntable automatically by one step upon completion of the opertaions at all of said loading, unloading, cleaning and tube closing mechanisms.

Referring to FIG. 1, and first describing the general organization of the illustrative apparatus, the apparatus includes an infeed conveyor 2 which supplies to the machine the product to be frozen, delivering it to a holding bin 4. An operator takes the product to be frozen, e.g., fish fillets, from the holding bin 4 and places them in a weigh pan 6 disposed on a scale 8. When a pan 6 contains a charge of the proper weight it is placed on a conveyor 10 which delivers the pans 6 in succession to a position adjacent a pair of loading chutes 12 into which an operator dumps the weighed charge of fillets at proper intervals in time with the operation of the machine. Each weighed charge is delivered by the loading chute 12 into one of a pair of loading hoppers 14. From the loading hoppers 14 the weighed charges are conducted by freezing apparatus subsequently to be described through the freezing operation and each frozen product is delivered by unloading mechanism at 16 onto an unloading conveyor 18 in the form of a frozen log 19 of cylindrical, rectangular or other cross-section. The logs 19 are carried in succession by conveyor 18 through mechanism at 20 in which the ends of the logs are trimmed and from which the logs are conducted by the discharge end 18' of the conveyor 18 to a storage or processing area as desired. The end trimmings are carried by conveyor 22 to a defrost mechanism 24 in which the trimmings are unfrozen and from which the trimmings are carried by conveyor 26 to the holding bin 4 to be added to the incoming unfrozen product.

The freezing apparatus, referring to FIGS. 1, 2, 3 and 15, comprises in general organization a stationary frame 28 on which is supported, as by rollers 32 and bearing 33, for rotation thereon a rotary turntable 30 carrying adjacent its periphery a series of forty freezing units 34 arranged in a circle. Coaxial with the turntable 30 and supported thereon is a receiver 35, FIGS. 1, 12, 13 and 15, forming part of the refrigeration system to be hereinafter described. Each freezing unit 34, FIG. 2, includes two vertically arranged tubes 36 within which the fillets to be frozen are received and are frozen, surrounded by a jacket 38 within which refrigerant and, later, hot gas is circulated outside the tubes 36. The upper (and lower) ends of the tubes 36 open through the top (and bottom) of the jacket 38 as shown. Pipes 40 and 42 lead into the jacket 38 adjacent its top and bottom respectively for conveying refrigerant or hot gas into and out of the jacket 38.

In the embodiment shown the tubes 36 have a horizontal cross-sectional shape resembling a fish fillet so that when the frozen logs 19 later are sawed along transverse planes into individual portions each portion resembles a fish fillet. Adjacent the top of each freezing unit is a top closing unit or slide 44 slidable radially of the turntable on guides 46 from an inner position in which it clears the top of the freezing unit to an outer position in which it is directly above the freezing unit. Carried on the top closing unit 44 for vertical movement thereon is a pair of heads or end plugs 48 movable vertically from a lower position in which they enter the upper ends of the tubes 36 to close them and an upper position in which they are entirely clear of the tubes and the top of the freezing unit. Such vertical movement is effected by a fluid motor in the form of a pneumatic cylinder 50. Each head or end plug is hollow and provided with pipe connections for the circulation of hot gas therein. Carried on the turntable adjacent the bottom of each freezing unit is a bottom closing unit 52 carrying bottom closing heads or plugs 53, similar to the top closing unit just described. Plugs 53 are arranged to tightly close the bottoms of the tubes 36.

Surrounding the receiver 35 is hot gas supply header 54, exhaust header 56 and a liquid refrigerant supply header 58, each of these headers being connected to the refrigerant system, and in turn connected individually to each freezing unit through pipes 40, 42 and suitable valves so as to carry out the freezing and defrosting operations as will be hereinafter described. Anoher header 59 supplies pressure air for operating the various air motors and control valves. The turntable carries an internal ring gear 60 through which the turntable is rotated in a step-by-step fashion by a drive pinion 62 driven by a motor 64. The drive of the turntable, closing and opening of the ends of the freezing tubes, loading and unloading of the tubes, and circulation of refrigerant or hot gas respectively through the jackets 38, all in proper sequence, is carried out automatically through a system of air motors and control valves and pilot valves therefor, as will be described.

The freezing units 34 are carried in succession by the turntable 30 through a series of stations at which successive operations are performed, during a dwell of the turntable. At a loading station 66, FIGS. 1 and 3, a weighed portion of fillets is loaded into each of the two tubes 36 of the freezing unit 34 at that station, the top closing unit being in retracted and open position and the bottom closing unit in closed position. At the next step of the turtable 30, the loaded freezing unit 34 moves into a closing station at 68 in which the top closing unit 44 is moved from its inner position to its outer position above the freezing tube. At the next step the loaded freezing unit moves into the freezing station at 70, where top end plug 48 is closed and the hot gas supply is discontinued, liquid refrigerant instead being introduced, into the bottom of the jacket 38, from refrigerant header 58 through the pipe 42 and vaporous refrigerant withdrawn from the top of the jacket through pipe 40 and into the suction header 56, for freezing the fillets. Such freezing condition continues throughout the next 315° of rotation of the turntable until the freezing unit reaches a defrost station at 72 whereupon supply of the liquid refrigerant is discontinued and, instead, hot gas is circulated in the opposite direction through the jacket 38 of the freezing unit and within the end plugs 48, 53, such hot gas circulation continuing for 45° of rotation of the turntable. The hot gas is supplied from the hot gas header 54 to pipe 40 and withdrawn from pipe 42 into the suction header 56. Such hot gas circulation conditions the freezing unit for opening of the end plugs and retraction of the end closing units and for removal of the frozen log of fillets. At the next station at 74 the top closing unit 44 has been retracted to its open position, FIG. 3, the bottom closing unit 52 is retracted and the two frozen logs 19 are ejected downwardly from the tubes 36 and transferred by the unloading mechanism 16 to the conveyor 18, as will be described. At the next station at 76 the empty tubes 36 are washed and cleaned, hot gas circulation continuing. At the next step the freezing unit 34 completes its circuit and moves into the loading station, hot gas circulation continuing. The operations at the several stations are carried out automatically by air motors controlled by control valves and pilot valves operated by the motion of the turntable and other mechanism at each of the stations.

The drive for rotating the turntable 30 step-by-step will now be described. Referring to FIG. 3, air under pressure for controlling the main drive is supplied from the air header 59 through a line 78 and first conducted through a series of normally closed valves 80, 82, 84 and 86. Valve 80 is located at the loading station, valve 82 at the closing station, valve 84 at the unloading station and valve 86 at the washing station. During the performance of the operations at each of these stations the valve at that station remains closed. Only when the operation at a station has been completed and the apparatus at that station is in condition to permit the turntable to step forward is the valve at that station operated to open position. As these valve are in series, the main drive cannot operate until all of them are open. When all are open, air under pressure is admitted through line 88, through control valve 90 and line 91 to an air operated clutch 92 to connect shaft 94 to the drive motor 64. Shaft 94 drives the driving member of a standard Ferguson drive 95 which rotates the pinion 62 to drive the turntable through the ring gear 60. The Ferguson drive 95 moves the turntable accurately by one step, which in this illustrative machine is 1/40 of a circumference. A Geneva motion could be used in place of the Ferguson drive. When the Ferguson drive has completed a step of the turntable, an operating finger 96 on shaft 94 engages and opens normally closed valve 98 which then supplies air under pressure from line 88 through lines 100 and 102 to the lower end 104 of valve 90 to move the spool of valve 90 upwardly from the position shown to open the clutch 92 and to apply air pressure through line 106 to operate the brake 108 to bring shaft 94 to a stop, with finger 96 having moved out of engagement with valve 98. The lower end 104 of valve 90 is provided with a small air bleed port 105 through which air is bled out to permit the spool to be returned by a spring from its upward position to the lower position shown in FIG. 3 to restore valve 90 to condition for the initiation of the next stepping operation of the turntable. In the meantime, at least one of the normally closed valves 80, 82, 84, 86 is returned to its normally closed condition by apparatus at its station, preventing stepping of the turntable until all of the operations at the respective stations are completed and all of the valves 80, 82, 84, 86 are again open. A stepping movement of the turntable 30 is thus initiated upon opening of the last one of the valves 80, 82, 84, 86 to be opened by mechanism at its station upon completion of the operation at that station, whereupon the turntable steps one step and again comes to rest, the valves 80, 82, 84, 86 then being closed and each remaining closed until completion of the operation at its corresponding station.

The apparatus and operations at the loading station will now be described, referring to FIGS. 3, 5, 6, 7, 8 and 9. As the turntable makes an advancing step the empty and cleaned freezing unit 34 which is to be loaded makes momentary contact with a normally closed pilot valve 110, FIG. 7, mounted on the stationary frame 28 and connected into the control system for the loading station as illustrated in FIG. 9. Opening of valve 110 bleeds air from line 112 to cause automatic-return cylinder 114 to advance and engage pusher finger 116 with bottom closing unit 52 and move it radially outwardly of the turntable to closing position. Cylinder 114 then automatically returns.

The bottom closing plug 53 is then moved upwardly to closing position under the control of control valve 118 mounted on the turntable 30, there being one such control valve 118 for each freezing unit 34. The valve 118 is a 3-position 4-way valve of well known construction, all ports being closed in the central position. For simplicity of illustration the valve 118 (and other similar valves) is shown in FIG. 9 and elsewhere throughout this application as a 2-position valve. The spool of the valve 118 is adapted to be moved to one end or the other of the valve body by normally closed pilot valves 120, 121 mounted on the turntable and connected to the opposite ends of the valve 118. Carried on the stationary framework 28 are stationary cams 122, 123 for operating the pilot valevs 120, 121. The cams 122, 123 are of greater or less depth as required to engage and depress, or to release, the control button of the pilot valves 120, 121 to produce the desired sequence of operations, as will be described. As the unit 34 to be loaded continues its motion into the loading station at 66, the cam 122 operates pilot valve 120 to cause application of air pressure from line 59 and line 119 through line 124 to air motor 126 to raise the lower end closing plug 53 into closed position. The top closing unit 44 remains in its open position and the top end plug 48 remains raised. The freezer unit 34 at the loading station is now in condition to be loaded.

Loading is effected by means of a loading unit indicated generally at 128, FIG. 5, mounted for vertical movement as a whole on slideways on the frame 28, of which one is shown at 130. The loading unit includes a loading tube 132 carrying loading hopper 14 at one end and having at the other end a vacuum chamber 134 having its lower open end adapted to make close fitting contact with the pper end of tube 36 of the freezing unit 34. There are two loading tubes 132 leading into the vacuum chamber 34, one for each tube 36. A suction fan 136 is connected through flexible tube 138 to the top of the vacuum chamber 134 to create a condition of lowered pressure within the tubes 36 and the vacuum chamber 134 and loading tube 132 during the loading operation to draw the fillets through the loading tube 132 from the hopper 14. The connection of flexible tube 138 to fan 136 is adapted to be opened and closed by a slide valve 140 operated by air motor 142. The loading tube 132 is surrounded by a jacket 144 through which cold water is continuously circulated through inlet pipe 146 and outlet pipe 148 to absorb any friction heat generated during loading and to bring the temperature of the interior of loading tube 132 below the dew point, condensing moisture over the interior of tube 132 and thereby lubricating the tube for easy flow of fillets therethrough. Each loading hopper 14, of which there is one for each loading tube 132, includes an outer conical member 150 opening at its lower end into the loading tube 132 and supported thereby and by the jacket 144. Supported inside the conical member 150 is a hollow conical member having an inner wall 152 provided with a multiplicity of small perforations 154, and an imperforate outer conical wall 156. Air under pressure is supplied from air header 59 through the line 158 to the interior space between the inner and outer walls 152, 156. For each hopper 14 there is provided a hollow generally spherical feed member 160 having therein a multiplicity of perforations 162 and supported on a hollow pipe 164 opening into the interior of the spherical member 160. The pipe 164 is supported on the lower end of an open-coil spring 166 having its upper end connected to a hollow tube 168 which leads into the interior of an air header 170 which is supplied with air under low pressure through line 172. The tube 168 is connected to the pipe 164 through a flexible hose 174 so that air from line 172 is conducted into the interior of the feed member 160. During the loading operation the header 170 is oscillated vertically by an air motor 175 under the control of a control valve 176, lines 177 and 178, normally closed pilot valve 180 connected through line 182 to the upper end of control valve 176, and normally closed pilot valve 184 connected through line 186 to the lower end of control valve 176. Line 186 contains a normally-closed valve 187 for a purpose hereinafter described. As the header 170 reaches its upper position it operates the pilot valve 180 to reverse the spool in control valve 176, thus causing air motor 175 to advance and lower the header 170. As the header 170 reaches its lower position, it operates the pilot valve 184 to reverse the control valve 176 and cause the air motor 175 to retract and raise the header 170.

The loading operation proceeds as follows: As the lower end closing unit 52 is moved into closing position as previously described it operates normally-closed pilot valve 188 mounted on stationary frame 28, bleeding air through line 190 to shift the spool of a control valve 192 to the right as shown in FIG. 9. Control valve 192 admits pressure air from air supply line 59 through line 194 to line 196 and thence to the upper end of air motor 198 to lower the loading unit 128. Simultaneously, pressure air is admitted through line 200 to operate air motor 142 to open the valve 140 in flexible tubing 138. As the loading unit 128 begins to descend, a lug 201 on hood 134 operates normally-closed valve 80 in the turntable drive circuit to closed condition, preventing stepping of the turntable. As loading unit 128 moves into its lower position the lower end of hood 134 makes close fitting contact with the upper ends of tubes 36, lowering the pressure in the tubes 36 and the loading apparatus. Simultaneously a part 202 of the frame of the loading unit 128, as it moves downwardly, operates normally-closed valve 187 to open position to establish communication through line 186 between the pilot valve 184 (which now opens line 186 to atmosphere as header 170 is in its lower position due to gravity) and the lower end of control valve 176, thus initiating the vertical oscillating movement of the header 170 which continues during the loading operation until terminated at the end thereof, as will be described. The loading chute 12 has its end disposed above the loading hopper 14 so as to discharge the fillets therein. Under the influence of the lower pressure created by the fan 136 the fillets move through the loading tubes 132 and fall into the freezing tubes 36. The lowered pressure within the tubes 36 is conducive to proper interlocking of the fillets, filling the freezing tubes with a compact homogeneous mass of fillets. The continuous escape of air under pressure through the perforations 154 prevents the fillets from adhering to the interior of the conical wall 152. The vertical oscillation of header 170 causes the feed member 160 to alternately open and close the entrance to loading tube 132 facilitating even entry of the fillets into the loading tube 132. Feed member 160 in its oscillating movements, due to the flexibility of spring 166 and flexible hose 174, may move in all directions with respect to the header 170 and take other positions than that shown to accommodate itself to the fillets as they are moved into the loading tube 132. When the weighed portion of fillets has been entirely unloaded from the loading hopper, air may then more freely escape through the perforations 162 in the feed member 160 thus lowering the pressure in line 172. Such lowered pressure is sensed by a pressure sensitive switch 206 in line 172 which operates a solenoid 208 to bring about an advancing stroke of air cylinder 210 which is supplied with pressure air through line 212. Such advancing stroke terminates the loading operation by opening normally-closed pilot valve 214 which bleeds air through line 216 from the left-hand end of control valve 192 to move its spool from its position shown so that it now admits pressure air from line 194 through line 218 to the lower end of cylinder 198 to lift the loading apparatus 128. At the same time, pressure air is admitted through line 220 to air motor 142 to close the slide valve 140 in flexible tube 138. As the loading unit 128 rises, the frame part 202 lifts off of valve 187 to allow it to close and terminate the vertical oscillating movement of header 170, the header dropping by gravity to its lower position to open valve 184. Air cylinder 210 automatically returns to its lower position. As the loading unit 128 reaches its upper position, lug 201 on the hood 134 opens the normally closed valve 80 located in the air pressure supply line to the turntable drive mechanism, thus clearing the turntable drive for its next step.

Referring to FIGS. 3, 4, 10, 11 and 13, as the loaded freezing unit 34 moves out of the loading station 66 on the next stepping movement of the turntable 30 its lower end plug 53 is closed and its upper end plug 48 is open. As it moves into the closing station 68, frame part 46' on the turntable 30 momentarily engages pilot valve 222 bleeding air from line 223 to cause an advancing stroke of automatic-return air cylinder 224. The piston rod 226 of cylinder 224 carries on its outer end a pivoted dog 228, FIG. 4, which swings on its pivot to allow it to pass the frame part 44' of the top closing unit 44 as shown in dotted lines in FIG. 4, and then is returned by spring 230 into its full line position so that upon the automatic return stroke of cylinder 224 it engages the frame part 44' and draws the top closing unit 44 on its slides 46 radially outwardly into closing position. As the return stroke is completed and the top closing unit 44 reaches its closing position a lug 232 on the piston rod 226 operates valve 82 in the pressure air supply line to the turntable operating mechanism to clear the turntable for the next step.

Upon the next stepping movement of the turntable, the loaded freezing unit 34 moves on into the freezing station 70 and stationary cam 23 on stationary frame member 28 operates pilot valve 236 of a control valve 238 carried on the turntable and similar in construction to the valve 118 previously described. Such operation of pilot valve 236 moves valve 238 into the condition shown in FIG. 13 in which pressure air is supplied from the supply line 59 from line 240 through line 242 to the upper end of cylinder 50 to move it downwardly and move the top end closing plugs 48 into closed position, in the freezing tubes 36. The product is thus compressed to the desired density. The freezing unit 34 is now loaded, both its end plugs are closed and it is in condition for the freezing step.

The freezing step is initiated in station 70 simultaneously with the closing of the top end plug 48 by admission of pressure air from line 242 through line 244 to air motor 246 to move its piston upwardly and open valve 248 to supply liquid refrigerant from the refrigerant header 58 to the inlet pipe 42 at the bottom of the jacket 38 of freezing unit 34. At the same time pressure air is supplied from line 244 through branch line 250 to air cylinder 252 to operate valve 254 to move its piston upwardly to close valve 254 to discontinue supply of hot gas to the jacket 38 from the hot gas header 54. The liquid refrigerant is evaporated in the jacket 38 to freeze the fillets and refrigerant is withdrawn from the pipe 40 at the top of the jacket and returned to the suction header 56. Simultaneous and reverse operation of valves 248 and 254 serves to transfer the freezing unit 34 from the hot gas supply condition to the freezing condition, and vice-versa. Operation of the refrigeration circuit and apparatus will be described in more detail hereinafter. The described (freezing) condition of valves 248 and 254 is continued for 315° of rotation of the turntable from the station 70 to effect freezing of the fillets.

Figure 13:
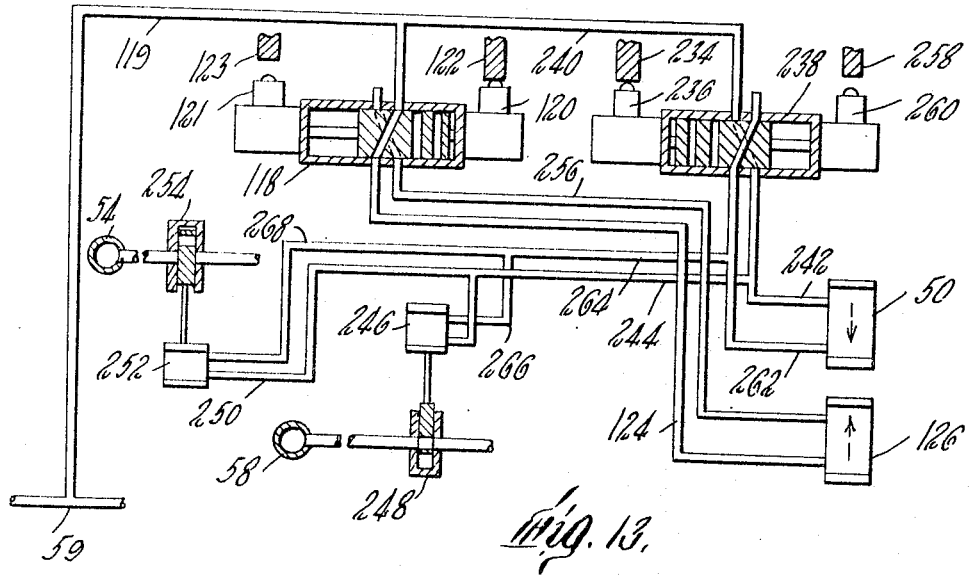
FIG. 13 is a piping diagram of the air motors and control valves for controlling the refrigerant circuit and the end closing plugs of the freezing units.

As the freezing unit 34 completes its circuit of the 315° freezing phase, it enters a defrost station 72, FIGS. 1 and 3. Referring now particularly to FIGS. 3 and 13, as the freezing unit 34 enters the defrost station at 72 cam 123 operates pilot valve 121 of control valve 118 to reverse its spool from the position shown in FIG. 13 to admit pressure air from air supply line 59 and line 119 through line 256 to apply pressure to the upper end of cylinder 126 to tend to open the bottom plug 53. Simultaneously cam 258 opens pilot valve 260 to reverse the spool in control valve 238 from the position shown in FIG. 13 to apply pressure air through line 262 to the lower end of cylinder 50 to tend to open the top closing plug 48. At the same time pressure air is supplied from line 262 through lines 264 and branch lines 266 and 268 to reveres the cylinders 246 and 252 and thus reverse the valves 248, 254 in the refrigeration circuit to change it over from refrigerant supply to hot gas supply, which phase continues for 45° of rotation of the turntable thereafter.

Figure 14:
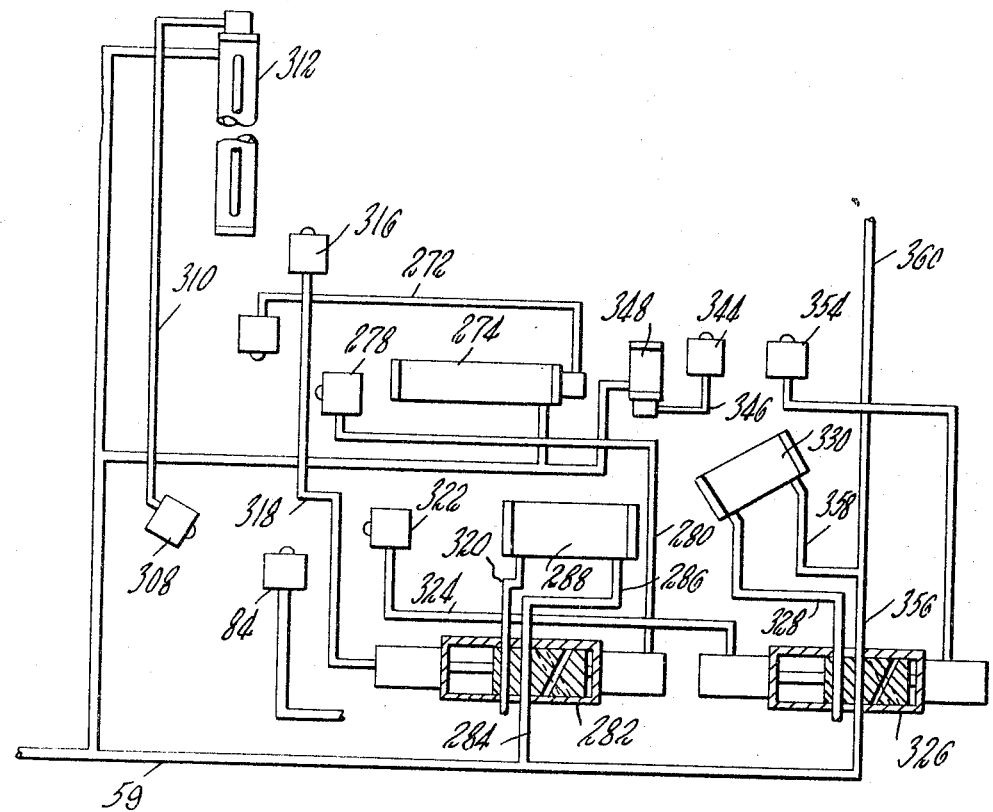
FIG. 14 is a piping diagram for the air motors and control valves for operating the mechanism at the unloading station.
Figure 17:
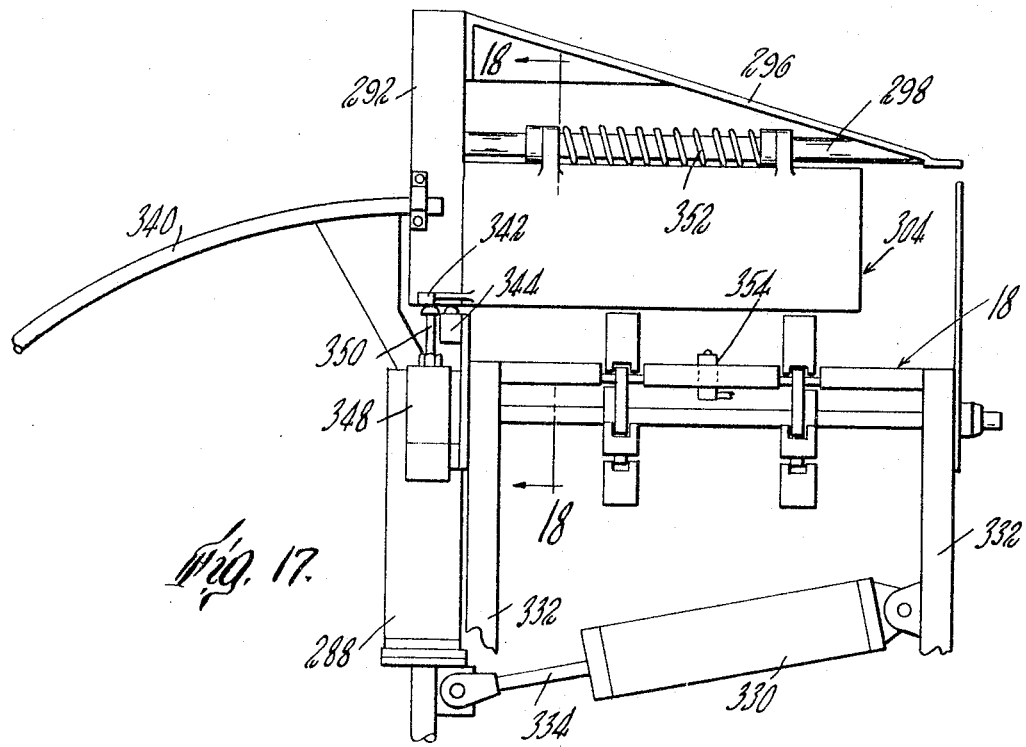
FIG. 17 is an end elevation to an enlarged scale of the unloading conveyor and associated parts appearing in FIG. 15.
Figure 18:
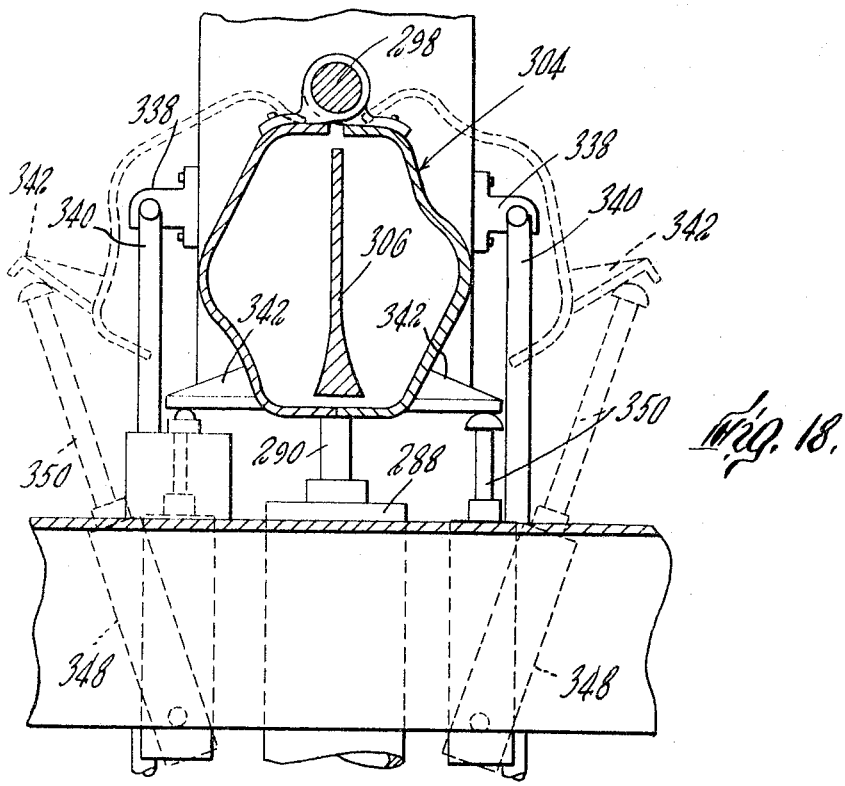
FIG. 18 is a vertical sectional view taken on line 18—18 of FIG. 17.
Figure 19:
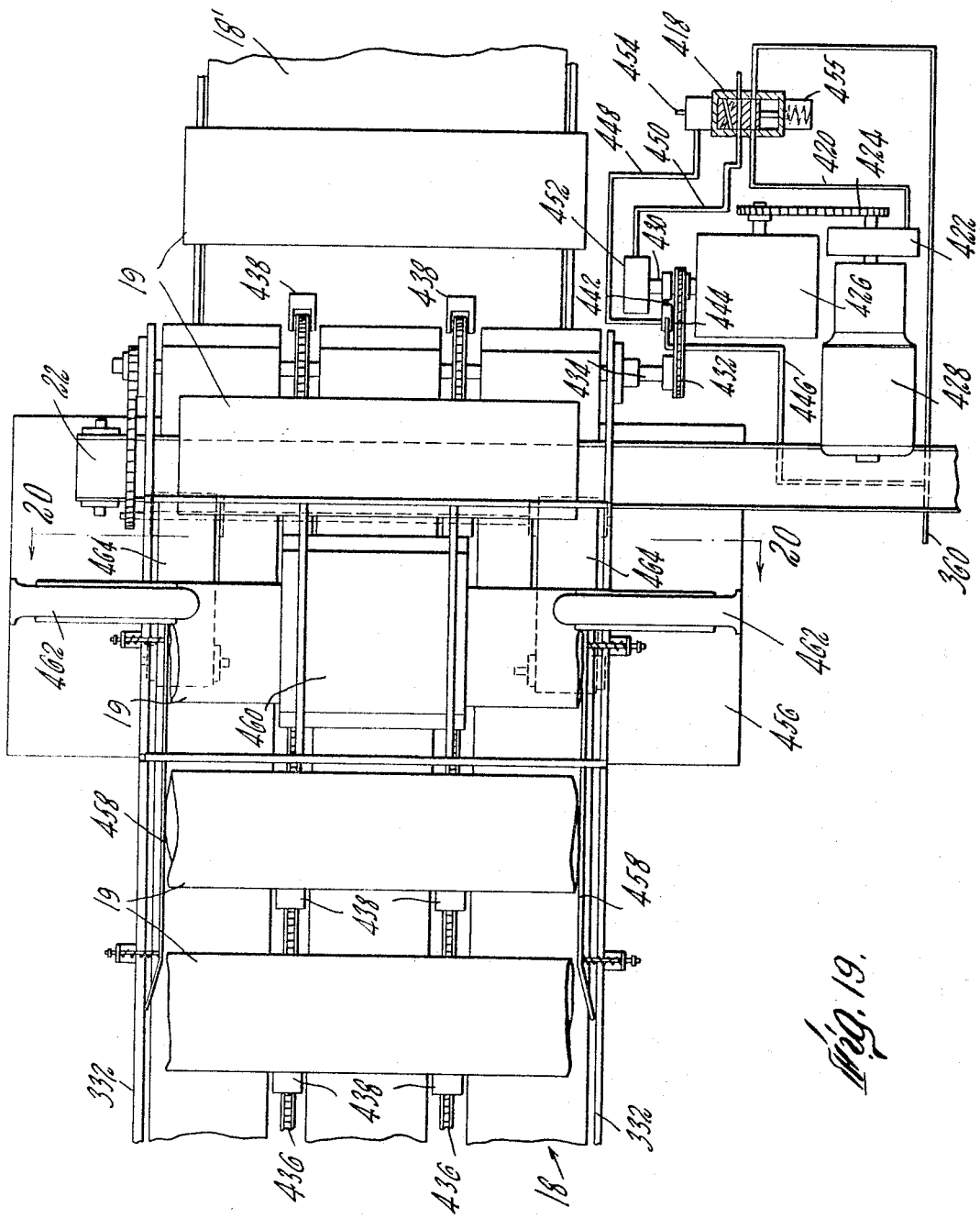
FIG. 19 is a plan view of the unloading conveyor appearing in FIGS. 15 and 17 showing the apparatus for trimming the ends of the frozen log, showing the drive mechanism for operating the unloading conveyor and including a piping diagram for the air motors and control valves thereof.

At the next step of the turntable the freezing tube moves from defrost station 72 into unloading station 74, both top and bottom closing plugs 48, 53 being open, and hot gas circulating in the jacket 38 and the end plugs 48, 53. Referring to FIGS. 3, 14, 15, 16, 17, and 18, as the freezing unit 34 moves into unloading station 74, top closing unit 44 engages a pilot valve 270, bleeding air through line 272 to initiate an advance stroke of automatic-return cylinder 274, the piston rod 276 of which moves the top closing unit 44 inwardly to its open position. Cylinder 274 then automatically returns. Upon its return stroke, the piston rod 276 operates a normally closed pilot valve 278 to open position, bleeding air from line 280 to operate the spool of control valve 282 to the position shown in FIG. 14, in which position pressure air is supplied from air header 59 through line 284 and line 286 to the right hand end of cylinder 288 to cause an advancing stroke of its piston rod 290 to move slide 292 on the slideways 294 to the left as seen in FIGS. 15, 16. Carried on the slide 292 is a bracket 296 supporting the upper end of a rod 298 whose lower end is fixed to the slide 292. Pivoted on rod 298 are two halves 300, 302 of a chamber 304 for the reception of the frozen logs 19 to be discharged from the freezing unit 34. A partition 306 fixed on slide 292 divides the chamber 304 into two parts, one for each log. During its advancing stroke the slide 292 operates valve 84 in the air supply line to the turntable drive to closed condition, preventing stepping of the turntable. During the latter part of the movement of the slide 292 the upper end of bracket 296 engages and moves the lower end closing unit 52 radially inward to open position. At the end of its movement, as chamber 304 reaches position B, FIG. 15, bracket 296 engages and opens normally closed pilot valve 308 to bleed air from line 310 to cause an advancing stroke of automatic-return cylinder 312. There is one cylinder 312 for each of the tubes 36 and log 19 therein. The piston rod of cylinder 312 carries on its lower end a head 314 which, as the piston rod descends, engages the log 19 to eject it from the freezing tube 36 and into the chamber 304. Cylinder 312 automatically returns and toward the end of its return stroke the head 314 momentarily opens normally-closed valve 316 to bleed air through line 318 from the left hand end of control valve 282 to move its spool to the left from the position shown in FIG. 14 to supply pressure air from line 284 through line 320 to cylinder 288 to cause a retracting stroke of this cylinder and through its piston rod 290 to move slide 292 to the right, FIG. 15, to position the chamber 304 with log 19 therein in position A, FIG. 15. Toward the end of its movement to the right, the slide 292 operates normally closed valve 322 to bleed air through line 324 from the left hand end of a control valve 326 to move its piston to the left, FIG. 14, and apply pressure air from air header 59 through line 328 to the lower end of cylinder 330 to cause a retracting stroke of that cylinder. Cylinder 330 is pivoted on a framework 332 and has its piston rod 334 connected to cylinder 288 which is mounted on slideway 294 and also is pivoted on framework 332 at 336. The retracting stroke of cylinder 330 thus swings cylinder 288 along with the slideway 294 and slide 292 thereon with its associaed structure, including the chamber 304, into position C directly above the framework 332 as shown in dotted lines in FIG. 15. During such swinging movement of the slideways 294, ears 338 engage arcuate guides 340 and ride thereon. Framework 332 supports the unloading conveyor 18. The chamber 304 is now opened to the dotted line position shown in FIG. 18 to discharge the frozen logs 19 onto the unloading conveyor 18. This opening action is initiated as chamber 304 reaches its final position C above the conveyor 18 by lug 342 which engages and operates normally closed pilot valve 344 to bleed air from line 346 to cause an advancing stroke of each of two cylinders 348 to cause each of those cylinders to advance its piston rod 350 upwardly and by engagement with lugs 342 pivot each of the halves 300, 302 on rod 298 into the open position shown in dotted lines in FIG. 18, allowing the frozen logs 19 to fall out of chamber 304 and on to conveyor 18. Cylinders 348 then automatically return, returning the halves 300, 302 to closed position in which they are held by spring 352. As the frozen log 19 falls on to the conveyor 18 it operates normally closed valve 354 which bleeds air through line 356 from the right hand end of control valve 326 to move its spool to the right as seen in FIG. 14 and admit pressure air from air header 59 through line 356 and branch line 358 to the upper end of cylinder 330 to cause an advancing stroke of its piston rod 334 to return the slideway 294 downwardly to the full line position, FIG. 15. At the same time, pressure air is admitted to another branch line 360 to initiate operation of the conveyor 18 as will be described hereinafter. Return of the slideway 294 to such full line position operates valve 84 to open condition. The unloading station 74 is now clear for the next step of the turntable.

Upon the next step of the turntable 30, the unloaded freezing unit 34 moves from the unloading station 74 into a cleaning and washing station at 76, with its upper and lower end closing units in open position and with hot gas circulating in the jacket 38. Referring now to FIGS. 3 and 22, when the freezing unit 34 to be washed is in the cleaning station 76 its frame part 361 operates normally-closed valve 362 to bleed air from line 364 and cause a return stroke of cylinder 366, supported on the stationary framework 28. Piston rod 368 of cylinder 366 in its fully advanced, upward, position engages valve 86 in the turntable drive circuit and holds it in open condition to permit drive of the turntable. Upon initiation of the return stroke of cylinder 366 its piston rod 368 moves out of contact with valve 86 to return it to its normally-closed condition, closing the air supply circuit to the turntable drive. The piston rod 368 carries at its upper end a bracket 370 on which is mounted a header member 372. Also mounted on the framework 28 is a standard 374 carrying on bracket 376 a flexible hose reel 378 from which flexible hose 380 leads to the header member 372 and supplies water to each of two water supply pipes 382, one for each freezing tube 36. Hose 380 is supplied with water through a water supply line 384. Each of the pipes 382 has a spray nozzle 386 at the lower end thereof. A cap member 388, adapted to close the open top end of the freezing unit 34, is slidable on the pipes 382. Downward movement of piston rod 368 carries with it bracket 370, header member 372 and pipes 382 with their nozzles 386, nozzles 386 moving throughout the length of the freezing tubes 36. The cap 388 moves downwardly with pipes 382 until it engages and closes the top of the freezing unit 34, whereupon the pipes 382 slide through the cap. As the spray nozzles enter the tubes 36, a valve operating lug 390 on bracket 370 engages the operator 392 of a pilot valve 394 causing it to bleed air through line 396 from the lower end of a control valve 398 to move its piston downwardly as seen in FIG. 22 to apply pressure air from header 59 and line 400 to line 402 and thence to the upper head space of cylinder 404 to move the spool of valve 406 in water supply line 384 downwardly into open condition of the valve. Water under pressure is thus supplied through the flexible hose 380 and the pipes 382 to the spray nozzles 386 during their downward travel through the tubes 36 to thoroughly wash the tubes. The wash water is drained from the tubes into a drain 408. When cylinder 366 has completed its retracting stroke it automatically executes its advancing stroke, lifting the nozzles 386 and further washing all parts of the tubes 36. As the nozzle in its upward travel engages the cap 388 it lifts it into the position shown in full lines in FIG. 22. As the valve operating lug 390 moves upwardly it engages and operates the operating lever 410 to operate normally-closed pilot valve 412 and bleed air from line 414 to move the spool of control valve 398 into the position shown to apply pressure air from line 400 through line 416 to the lower head space of cylinder 404 to close valve 406 and shut off the water supply to flexible hose 380. As the piston rod 368 reaches its uppermost position it engages and opens valve 86 to clear the turntable drive for the next stepping movement of the turntable.

Upon the next stepping movement of the turntable the freezing unit 34 moves from the washing station 76 toward the loading station 66 and the described operations are repeated.

The operation of the unloading conveyor 18 and associated mechanism will now be described, referring to FIGS. 1, 14, 15, 16, 17, 18, 19, 20 and 21. As the frozen log 19 is dropped onto the conveyor 18 it operates pilot valve 354 to apply pressure air to branch line 360, as previously described. Pressure air from line 360 enters control valve 418 which is in the condition shown in FIG. 19, to supply pressure air through line 420 to air operated clutch 422 to close the clutch and thus through drive chain 424 drive the indexing mechanism 426 from the motor 428. The indexing mechanism 426 is similar to the Ferguson drive 95 previously described. It rotates driven shaft 430 through a single revolution, thus driving, through chain 432, the drive shaft 434 which, through suitable sprockets 437, drives the chains 436 forming part of the conveyor 18. Each chain 436 carries spaced lugs 438 which engage the log 19 which was deposited from the chamber 304 and slide it along the slats 440 forming part of the conveyor 18. One rotation of shaft 430 moves the lugs 438 by an amount equal to the spacing between adjacent lugs on the same chain, which spacing is sufficient to accommodate a log therebetween. As the shaft 430 approaches the end of its single revolution a finger 442 on the shaft engages and opens a normally-closed valve 444 to admit pressure air from line 360 through branch line 446 to branch line 448 and thus to the upper end of the control valve 418 to move its spool downwardly from the position shown, discontinuing supply of pressure air to line 420 and thus opening clutch 422, and, at the same time, admitting pressure air to line 450 and to air-operated brake 452 to prevent rotation of shaft 430. The shaft stops with the finger 442 out of contact with the valve 444, whereby application of pressure aid to line 448 is terminated. The upper end of valve 418 contains a small bleed port 454 from which air escapes to permit spring 455 to return the valve to the condtiion shown in FIG. 19, conditioning the conveyor drive for the initiation of the next step when pressure air is again supplied to line 360 by deposition of a log 19 on the conveyor 18.

As the frozen logs 19 are moved along by conveyor 18 they pass through a trimming area at 456 in which their ends are trimmed to remove any uneven ends and to produce products of a standard length. As the log approaches the trimming area its ends are engaged by spring-pressed vertical plates 458 to center the log endwise on the conveyor. As the log travels further it is engaged by a top pressure plate 460 which is spring-pressed downwardly to further hold and maintain the log accurately positioned during trimming. The trimming is performed by a pair of band saws 462. The trimmings fall onto conveyors 464 from which they are deposited on the transverse conveyor 22 by which they are conducted to the defrosting station at 24, ultimately being returned to the holding bin 4. The trimmed logs 19 thereafter continue their progress on the conveyor 18 and are delivered by its discharge end 18' to further processing, packaging or cold storage as desired.

Figure 11:
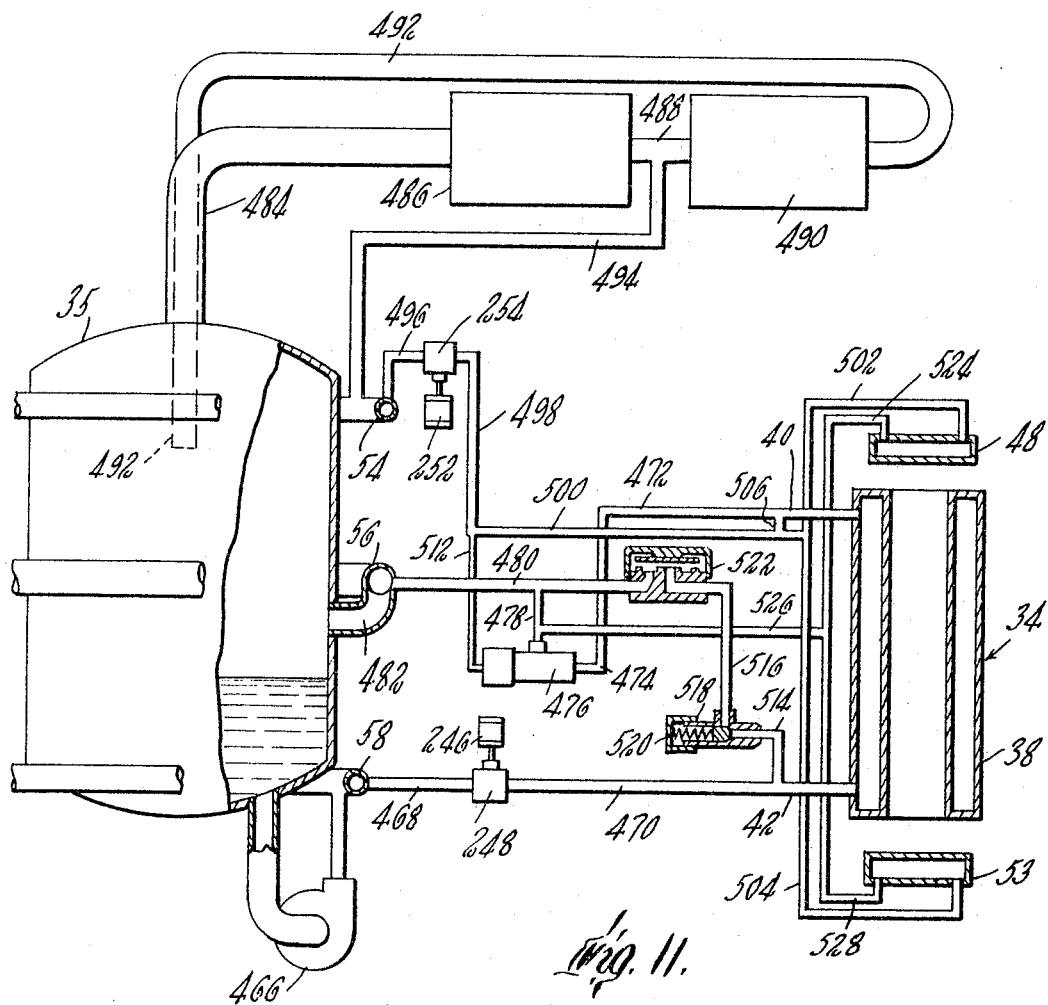
FIG. 11 is a piping diagram of the refrigeration system.
Figure 12:
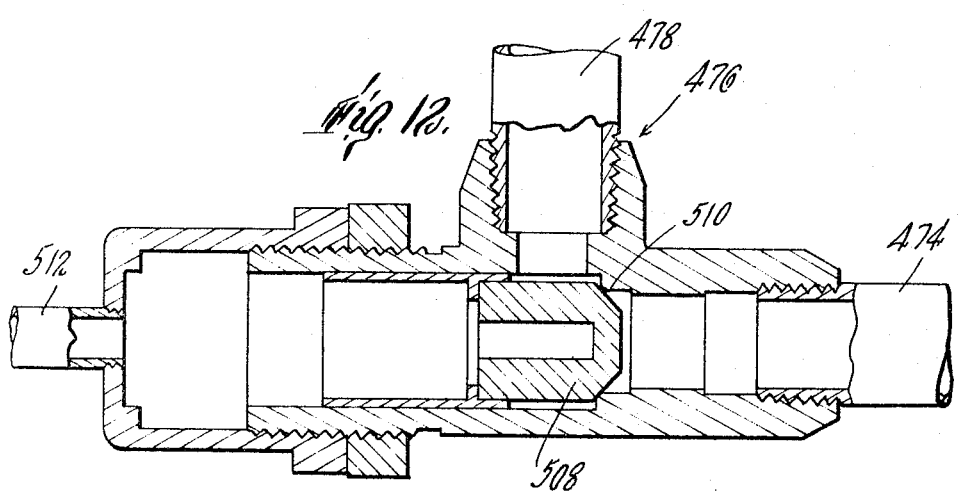
FIG. 12 is a detail view of a valve appearing in FIG. 11.

As has been stated, changeover from refrigeration condition to hot gas supply condition in the freezing units 34, and vice versa, is effected solely by operation of valves 248, 254, one of which is closed when the other is open, and vice versa. Referring to FIGS. 11 and 12, liquid refrigerant, such as ammonia, is supplied at low pressure to the refrigerant header 58 from the bottom of the receiver 35 by pump 466. The refrigerant is conducted through line 468 to valve 248 and thence through line 470 to the pipe connection 42 at the bottom of the freezing unit 34. The refrigerant is evaporated in the jacket 38 and withdrawn from top connection 40 through line 472, line 474, valve 476, line 478, and line 480 into the suction header 56 from which it is drawn through connection 482 into the receiver 35. Vaporous refrigerant is withdrawn from the top of receiver 35 through line 484 by compressor 486, from which hot gas is delivered through line 488 to condenser 490, from which liquid refrigerant is returned through line 492 to receiver 35, for recirculation to the freezing units 34 which are on the refrigeration phase.

For the freezing units 34 which are on the hot gas phase, the valve 248 is closed and the valve 254 is open. Hot gas is supplied to the hot gas supply header 54 from line 488 through line 494. From the header 54 hot gas passes through the valve 254 into line 498, through line 500 to line 502 to the top plug 48 and through line 504 to the bottom plug 53. From line 500 hot gas also passes through a branch line 506 into the top inlet 40 of the freezing unit 34. Flow of hot gas through line 472 is prevented by valve 476, shown in detail in FIG. 12. Valve 476 is provided with a sliding valve member 508 adapted to seat on seat 510 to prevent flow through the valve from lines 472, 474. The valve member 508 is held on its seat 510 by gas pressure through branch line 512 from line 498. During the refrigeration phase, valve member 508 is moved to the left by pressure from line 474, valve 254 in the hot gas supply line being closed, to permit flow of refrigerant through valve 476 into the exhaust header 56. Hot gas entering at the top of the freezing units 34 moves downwardly in the jacket 38 and under some conditions may be condensed to liquid form. The hot gas (or liquid) flows out through line 42 at the bottom of the jacket and, as valve 248 is now closed, through branch line 514 and into line 516 through a valve 518, valve 518 being identical with valve 476, previously described, except that it contains a spring 520 biasing the valve member 508 toward the right into engagement with seat 510. During the refrigeration phase the pressure in line 470 is insufficient to open the valve 518 but on the hot gas phase the pressure opens this valve to permit flow into line 516. From line 516 flow continues through a valve 522 into line 480 and thence into the exhaust header 56. Valve 522 may be constructed as shown in United States Patent No. 2,817,353. The top closing plug 48 is connected to the exhaust header 56 through line 524, line 526, line 478 and line 480. Similarly, the lower closing plug 53 is connected to exhaust header 56 through line 528, line 526, line 478 and line 480.

While a particular embodiment of the invention has been described herein in detail for purposes of disclosure of the invention, the invention is not limited thereto and comprises all the variations and modifications thereof embraced within the scope of the following claims.

I claim:

1. Freezing apparatus comprising a plurality of freezing tubes adapted to receive material to be frozen, a filling mechanism by which the tubes are successively filled and an unloading mechanism for unloading frozen material from said tubes in succession, said tubes being relatively movable with respect to said filling mechanism and said unloading mechanism, driving mechanism to produce such relative movement so that said tubes in succession and said filling mechanism are positioned with respect to each other for filling of said tubes successively by said filling mechanism and so that said tubes in succession and said unloading mechanism are positioned with respect to each other for unloading of the filled tubes successively by said unloading mechanism, mechanism for refrigerating the contents of the tubes during said movement, and mechanism for producing a condition of lowered air pressure within the freezing tube during filling thereof.

2. Freezing apparatus in accordance with claim 1 including mechanism for closing both ends of the tube and applying pressure to its contents while its contents are being refrigerated, and mechanism for moving said closing mechanism away from the ends of the tube when in unloading position.

3. Freezing apparatus in accordance with claim 2 wherein said closing mechanism comprises a closing unit movable toward and away from said tube into and out of a closing position, and a head mounted on said closing unit for movement axially of the tube when the closing unit is in closing position.

4. Freezing apparatus in accordance with claim 1 including mechanism for supplying heat to each freezing tube.

5. Freezing apparatus in accordance with claim 1 wherein said unloading mechanism includes a ram movable axially into the tube for ejecting its frozen contents.

6. Freezing apparatus in accordance with claim 1 wherein said unloading mechanism includes a conveyor for delivering the frozen material from the apparatus and a receptacle for receiving the frozen material from the tube and delivering it to the conveyor in a predetermined orientation with respect to the conveyor.

7. Freezing apparatus in accordance with claim 1 further including mechanism for cleaning an emptied tube.

8. Freezing apparatus in accordance with claim 1 further including a conveyor for receiving frozen material unloaded from said tubes and delivering it from the apparatus, and trimming mechanism for trimming the frozen material on said conveyor to a standard dimension.

9. Freezing apparatus in accordance with claim 8 further including mechanism for defrosting the frozen trimmings.

10. Freezing apparatus in accordance with claim 9 further including a loading conveyor for delivering material to be frozen to said loading mechanism, and a conveyor for delivering the defrosted trimmings to a point adjacent said loading conveyor.

11. Freezing apparatus in accordance with claim 1 wherein said loading mechanism includes a hopper for receiving material to be frozen, a loading tube connecting the bottom of said hopper to the open upper end of said freezing tube, and mechanism for lowering the pressure within said freezing tube and loading tube to cause material to move from said hopper into said freezing tube.

12. Freezing apparatus in accordance with claim 11 wherein the inner surface of said hopper is provided with a multiplicity of perforations, and including mechanism for directing streams of air into said hopper through said perforations.

13. Freezing apparatus in accordance with claim 11 wherein mechanism is provided at said loading mechanism for causing said loading mechanism to automatically perform a loading cycle upon arrival of an empty freezing tube at said mechanism.

14. Freezing apparatus in accordance with claim 11 further including a feed member vertically movable within said hopper and adapted in its lower position to substantially close the outlet of the hopper, and mechanism for vertically oscillating said feed member.

15. Freezing apparatus in accordance with claim 14 wherein said feed member has a multiplicity of perforations in its surface and mechanism is provided for directing streams of air outwardly through said perforations.

16. Freezing apparatus comprising a stationary frame, a turntable supported on said frame for rotation thereon, a plurality of freezing tubes supported on said turntable in a circle coaxial therewith and adapted to receive material to be frozen, a head movable axially of each tube for closing an end of the tube, mechanism at one location stationary with respect to said frame for loading material to be frozen into a tube at that location and producing a condition of lowered air pressure within the freezing tube during loading thereof, mechanism for moving said head to tube closing position upon loading of the tube, mechanism for refrigerating a loaded tube to freeze its contents, and mechanism at another location stationary with respect to said frame for unloading frozen material from a tube at that location.

17. Freezing apparatus comprising a stationary frame, a turntable supported on said frame for rotation thereon, mechanism for intermittently rotating said turntable, a plurality of freezing tubes supported on said turntable in a circle coaxial with said turntable and adapted to receive material to be frozen, mechanism at a loading station adjacent said turntable for loading material to be frozen into a tube at that station, heads movable axially of the tubes for closing the ends of the tubes and applying yielding pressure to their contents, mechanism for refrigerating each loaded and closed tube as it travels with said turntable through a fraction of a rotation to freeze its contents, mechanism for supplying a heating medium to the tube at the end of said fraction of a rotation, mechanism for moving said heads away from the tubes to open the ends of the tubes, mechanism at an unloading station for unloading the frozen material from the tube, and mechanism at a cleaning station for washing the unloaded tube.

18. Freezing apparatus in accordance with claim 17 wherein said heating medium is hot refrigerant.

19. Freezing apparatus in accordance with claim 17 wherein there is a separate mechanism at each of said stations to prevent rotation of said turntable during the operation at that station.

20. Freezing apparatus in accordance with claim 17 including mechanism at each of said stations for causing the apparatus at that station to perform a cycle of operation upon arrival of a freezing tube at that station.

21. Freezing apparatus in accordance with claim 17, wherein the mechanism for rotating said turntable automatically advances the turntable by one step upon completion of the operation at all of said stations.

22. Freezing apparatus comprising a plurality of freezing tubes adapted to receive material to be frozen, a filling mechanism by which the tubes are successively filled and an unloading mechanism for unloading frozen material from said tubes in succession, said tubes being relatively movable with respect to said filling mechanism and said unloading mechanism, driving mechanism to produce such relative movement so that said tubes are presented in succession to said filling mechanism and thereafter to said unloading mechanism, mechanism for refrigerating the contents of the tubes during said movement, a conveyor for delivering the frozen material from the apparatus, and a receptacle for receiving the frozen material from the tube and delivering it to the conveyor in a predetermined orientation with respect to the conveyor.

23. Freezing apparatus comprising a plurality of freezing tubes adapted to receive material to be frozen, a filling mechanism by which the tubes are successively filled and an unloading mechanism for unloading frozen material from said tubes in succession, said tubes being relatively movable with respect to said filling mechanism and said unloading mechanism, driving mechanism to produce such relative movement so that said tubes are presented in succession to said filling mechanism and thereafter to said unloading mechanism, mechanism for refrigerating the contents of the tubes during said movement, and mechanism for closing both ends of the tube and applying pressure to its contents while its contents are being refrigerated including a closing unit movable into and out of a closing position, a head mounted on said closing unit for movement axially of the tube when the tube is in closing position, and mechanism for moving said closing unit into and out of the closing position.

24. Freezing apparatus comprising a plurality of freezing tubes adapted to receive material to be frozen, a filling mechanism by which the tubes are successively filled and an unloading mechanism for unloading frozen material from said tubes in succession, said tubes being relatively movable with respect to said filling mechanism and said unloading mechanism, driving mechanism to produce such relative movement so that said tubes are presented in succession to said filling mechanism and thereafter to said unloading mechanism, mechanism for refrigerating the contents of the tubes during said movement, said loading mechanism including a hopper for receiving material to be frozen, a loading tube connecting the bottom of said hopper to the open upper end of said freezing tube, and mechanism for lowering the pressure within said freezing tube and loading tube to cause material to move from said hopper into said freezing tube.

25. Freezing apparatus in accordance with claim 24 wherein the inner surface of said hopper is provided with a multiplicity of perforations, and including mechanism for directing streams of air into said hopper through said perforations.

26. Freezing apparatus in accordance with claim 24 wherein mechanism is provided at said loading mechanism for causing said loading mechanism to automatically perform a loading cycle upon arrival of an empty freezing tube at said mechanism.

27. Freezing apparatus in accordance with claim 24 further including a feed member vertically movable within said hopper and adapted in its lower position to substantially close the outlet of the hopper, and mechanism for vertically oscillating said feed member.

28. Freezing apparatus in accordance with claim 27 wherein said feed member has a multiplicity of perforations in its surface and mechanism is provided for directing streams of air outwardly through said perforations.

29. Freezing apparatus in accordance with claim 3 further including a stationary frame, a turntable supported on said frame for rotation thereon, said freezing tubes being supported on said turntable, means for supplying hot refrigerant to each freezing tube preparatory to unloading it, a ram movable axially into the tube for ejecting its frozen contents, a conveyor for receiving frozen material unloaded from said tubes and delivering it from the apparatus and a receptacle for receiving the frozen material from the tube and delivering it to the conveyor in a predetermined orientation with respect to the conveyor, means for cleaning an emptied tube before it is refilled, trimming means for trimming the frozen material on said conveyor to a standard dimension, mechanism for defrosting the frozen trimmings, a loading conveyor for delivering the material to be frozen to said loading mechanism and a conveyor for delivering the defrosted trimmings to a point adjacent said loading conveyor, said loading mechanism including a hopper for receiving material to be frozen and having its inner surface provided with a multiplicity of perforations, mechanism for directing streams of air into said hopper through said perforations, a loading tube connecting the bottom of said hopper to the open upper end of said freezing tube and apparatus for lowering the pressure within said freezing tube and loading tube to cause the material to move from said hopper into said freezing tube, a feed member vertically movable within said hopper and adapted in its lower position to substantially close the outlet of the hopper, and mechanism for vertically oscillating said feed member, said feed member having a multiplicity of perforations in its surface and mechanism for directing streams of air outwardly through said perforations, mechanism associated with each of said loading, unloading, cleaning and tube closing mechanisms to prevent rotation of said turntable during the operation of the respective mechanism, and mechanism at each of said loading, unloading, cleaning and tube closing mechanisms for causing the respective mechanism to perform a cycle of operation upon arrival of a freezing tube at the respective mechanism, and mechanism for rotating said turntable automatically by one step upon completion of the operations at all of said loading, unloading, cleaning and tube closing mechanisms.

30. Freezing apparatus comprising a plurality of freezing tubes adapted to receive material to be frozen, a filling mechanism by which the tubes are successively filled, a loading conveyor for delivering material to be frozen to said filling mechanism, an unloading mechanism for unloading frozen material from said tubes in succession, said tubes being relatively movable with respect to said filling mechanism and said unloading mechanism, driving mechanism to produce such relative movements so that said tubes are presented in succession to said filling mechanism, and thereatfer to said unloading mechanism, mechanism for refrigerating the contents of the tubes during said movement, and a conveyor for receiving frozen material unloaded from said tubes and delivering it from the apparatus, trimming mechanism for trimming the frozen material on said conveyor to a standard dimension, mechanism for defrosting the frozen trimmings, and a conveyor for delivering the defrosted trimmings to a point adjacent said loading conveyor.

(References on following page)

References Cited by the Examiner

UNITED STATES PATENTS

| | | | |
|---|---|---|---|
| 2,007,837 | 7/1935 | Rudd et al. | 62—341 |
| 2,370,920 | 3/1945 | Schaub | 62—342 |
| 2,531,087 | 11/1950 | Tharaldsen | 62—341 |
| 2,565,245 | 8/1951 | Lebovitz | 62—341 X |
| 2,718,345 | 9/1955 | Howard | 141—7 |
| 2,780,927 | 2/1957 | Boyce et al. | 62—341 |
| 2,925,052 | 2/1960 | Glass | 62—390 X |
| 3,156,104 | 11/1964 | Norr et al. | 62—341 |

ROBERT A. O'LEARY, *Primary Examiner.*

MEYER PERLIN, *Examiner.*

W. E. WAYNER, *Assistant Examiner.*

UNITED STATES PATENT OFFICE
CERTIFICATE OF CORRECTION

Patent No. 3,320,768                                               May 23, 1967

La Vern H. Barrett

It is hereby certified that error appears in the above numbered patent requiring correction and that the said Letters Patent should read as corrected below.

In the heading to the printed specification, lines 4 to 6, for "assignor to The Gorton Corporation, Gloucester, Mass., a corporation of Massachusetts" read -- assignor to The Gorton Corporation, a corporation of Delaware --.

Signed and sealed this 21st day of November 1967.

(SEAL)
Attest:

Edward M. Fletcher, Jr.                                EDWARD J. BRENNER

Attesting Officer                                                 Commissioner of Patents